Figure 1:
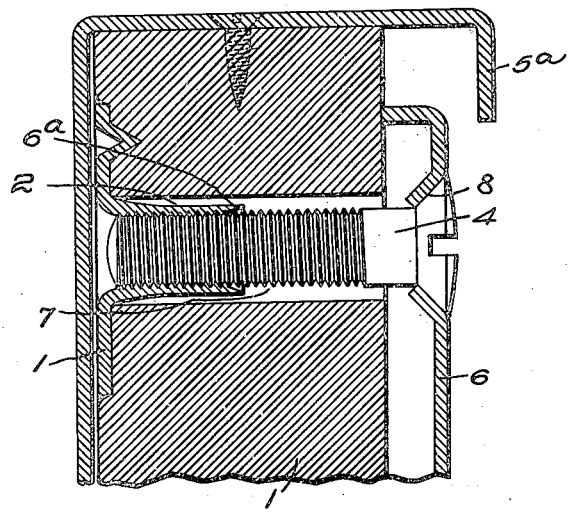

Aug. 23, 1932.  A. W. KIMBELL  1,873,894

NUT AND NUT AND SCREW FASTENED INSTALLATION

Filed June 13, 1930

Inventor:
Arthur W. Kimbell
by Emery, Booth, Varney & Townsend
Attys

Patented Aug. 23, 1932

1,873,894

UNITED STATES PATENT OFFICE

ARTHUR W. KIMBELL, OF NEWTON CENTER, MASSACHUSETTS, ASSIGNOR TO UNITED-CARR FASTENER CORPORATION, OF CAMBRIDGE, MASSACHUSETTS, A CORPORATION OF MASSACHUSETTS

NUT AND NUT AND SCREW FASTENED INSTALLATION

Application filed June 13, 1930. Serial No. 460,879.

My invention aims to provide improvements in nuts and nut and screw fastened installations.

In the drawing which illustrates a preferred embodiment of my invention:—

Figure 2:
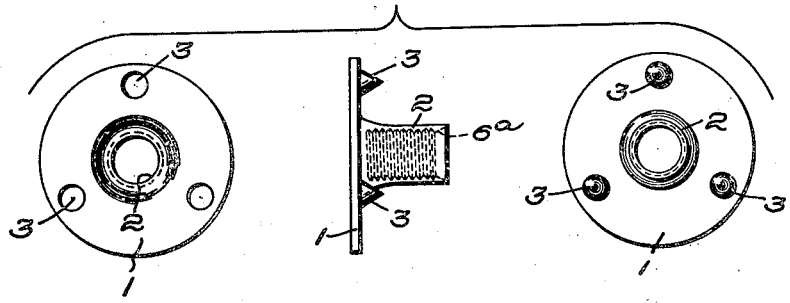

Figure 1 is a section through an installation showing my improved nut member as it appears when in use; and Fig. 2 includes side and end elevations of the nut.

Referring to the particular embodiment of my invention selected for illustration by the drawing, I have shown a simple, durable and efficient nut member made from a single piece of metal. The nut illustrated is formed from sheet metal and has a base flange 1 (Fig. 2), a hollow shank 2 threaded internally throughout its length. At intervals around the base flange 2 I have provided cone-shaped projections 3 pressed from the material of the base flange and extending in the same direction as the shank 2.

In use the nut cooperates with a screw 4 to secure two or more parts together. One use of the nut and screw is shown, in Figure 1, in which a portion of the metal frame 5ª of the door of a motor vehicle and a wooden piece 5, commonly called the lock board, to which is attached the door lock 6 (a portion of which is shown), the remote control handle, the window regulator and the like. In this particular installation the shank 2 of the nut extends into a bore 7 in the board 5 and the screw extends through an aperture 8 in the lock 6. During the attachment of the parts the shank of the screw 4 is guided into the hollow shank by the tapered entrance wall 6ª and threads its way into the shank 2 of the nut. As the parts are drawn together by the threading action the sharp pointed projections 3 are forced into the wooden frame piece 5, thereby preventing rotation of the nut as the screw is rotated.

The projections 3 provide a simple yet very efficient means to prevent rotation and once the nut and screw have been completely tightened relative to each other the installation can not easily become loosened. The nut installation shown is so simple and efficient that it has been quickly adopted by motor vehicle body manufacturers, because no lock washers are necessary and no difficult and expensive preparation of the parts is necessary before assembly.

If the frame piece 5 is of soft wood the tightening of the screw will automatically countersink the base flange 1 of the nut into the frame piece, as shown in Figure 1.

With the type of installation illustrated and described it has heretofore been the usual practice to countersink an ordinary nut into a cup washer countersunk into the board and use a washer. Therefore, my invention eliminates the necessity of using the cup washer and the lock washer. Furthermore, when it is necessary to remove a lock or other part it is only necessary to remove the screws 4, because the nut cannot fall out due to the proximity of the metal of the door, as clearly shown in Fig. 1. The nut will remain in position and cannot turn.

While I have illustrated and described a preferred embodiment of my invention, I do not wish to be limited thereby, because the scope of my invention is best defined by the following claim.

I claim:

In a nut secured installation, an apertured nut-carrying wooden board, a one-piece sheet metal nut having a base bearing against one face of said board, hollow cone-shaped board-engaging means extending from said nut into said board at points inside the periphery of said base and preventing rotation of said nut, a threaded shank extending from said base into the aperture in said board, an apertured part located at that side of the board opposite the side engaged by said base, a tapered wall surrounding the opening at the free end of said threaded shank, a screw having a shank passing through the aperture in said part and guided into threaded engagement with the threaded shank of said nut by the tapered wall of the shank thereby to hold the said part in position on said board.

In testimony whereof, I have signed my name to this specification.

ARTHUR W. KIMBELL.